March 18, 1930.  C. A. STYER ET AL  1,751,222
COMPENSATED GAS DETECTOR
Filed Aug. 30, 1928
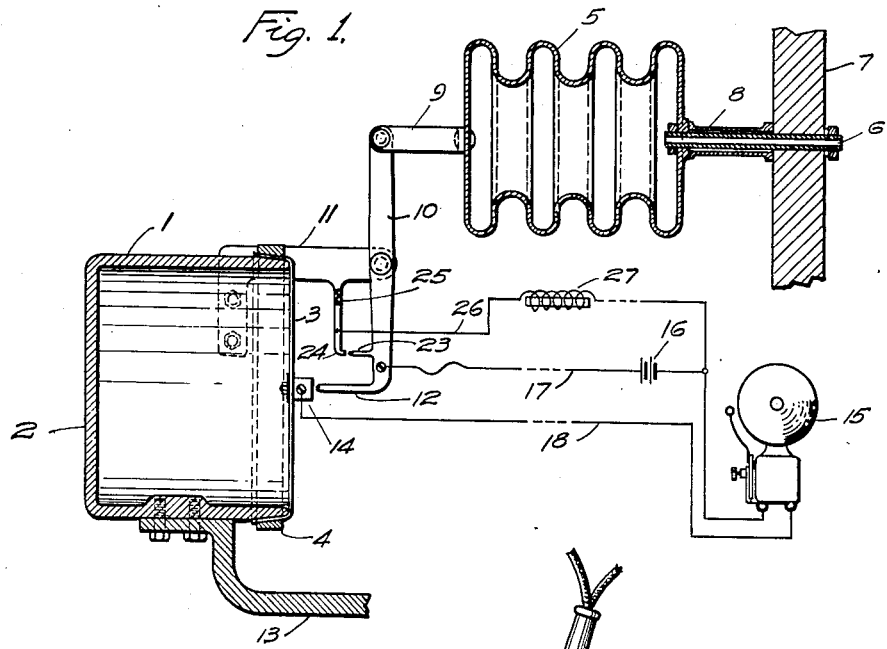
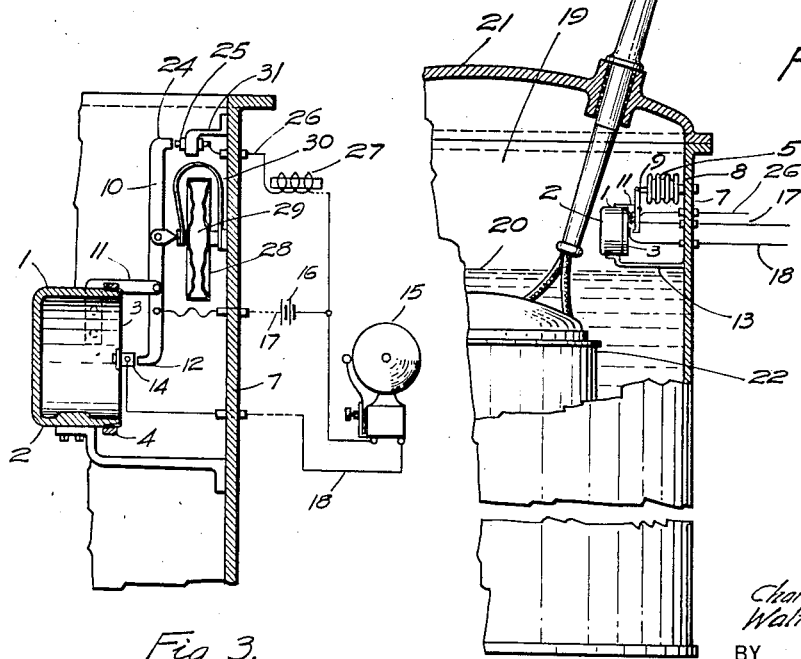
INVENTORS
Charles A. Styer +
Walter M. Dann.
BY
ATTORNEY Patented Mar. 18, 1930

1,751,222

UNITED STATES PATENT OFFICE.

CHARLES A. STYER, OF WILKINSBURG, AND WALTER M. DANN, OF SHARON, PENNSYLVANIA, ASSIGNORS TO WESTINGHOUSE ELECTRIC AND MANUFACTURING COMPANY, A CORPORATION OF PENNSYLVANIA

COMPENSATED GAS DETECTOR

Application filed August 30, 1928. Serial No. 303,092.

Our invention relates to indicators and more particularly to apparatus for indicating the presence of a particular gas in, and the pressure of, an encased fluid, such as the inert gas, in the space above the oil in the casing of a transformer.

It is characteristic of our invention that the gas detector is compensated for errors incident to changes in pressure of the gaseous medium.

It is further characteristic of our invention that the pressure-compensating device for the gas detector is provided with means for initiating an independent control when the pressure of the medium exceeds a predetermined maximum.

Atmolytic or diffusion-type gas detectors are subject to errors incident to differences in pressure between the spaces inside and outside the diffusion chamber that are due to causes other than atmolysis itself. We provide means for compensating for such pressure differences to thereby improve the accuracy of such gas detectors.

Our compensated atmolytic gas detector is particularly applicable for detecting a particular gas or gases in the gas space above the oil within the tank of an electrical apparatus, such as a transformer, in which changes in pressure, due to heating and cooling of the transformer, occur.

Embodiments of our invention are illustrated in the accompanying drawing, in which:

Figure 1 is a vertical section of a pressure-compensated gas detector comprising our invention, Fig. 2 is an elevational view, partially in section, of the gas detector shown in Fig. 1, as applied to a transformer, and Fig. 3 is a view, similar to Fig. 1, of a modification of our invention.

Similar numerals refer to similar parts throughout the several views.

Our device comprises an atmolytic gas detector 1 consisting of a porous cup 2 of porcelain or similar material having its open end covered by a flexible member 3 that may be conveniently held in position by a friction ring 4. We prefer that the flexible member 3 shall be of leather, or similar yieldable material because leather, in addition to being impervious to the oil vapors in which our device may be used, is also sufficiently elastic to be responsive to differences in pressure between the cup 2 and the surrounding medium.

A bellows 5 that consists, preferably, of a corrugated drum, is mounted on the side of the tank 7 by means of a connecting bolt 8. The inner chamber of the bellows 5 communicates with the outer air through an opening 6. The movable end of the bellows 5 is connected, by an arm 9, to the end of a lever 10. The latter is pivoted to a bracket 11 that is mounted on the side of the chamber 2. The free end of the lever 10 is provided with a contactor 12 that moves in accordance with the movement of the movable end of the bellows 5.

The cup 2 is mounted, preferably, on a bracket 13 that may conveniently extend from the wall 7. The flexible member 3 of the atmolytic gas detector 1 is provided with an electrical contacting member 14 that is adapted to cooperate with the contactor 12 of the lever 10. It will be noted that the fulcrum 11, the wall 7 and the cup 2 are all fixed with respect to each other.

In order to initiate a control when a predetermined pressure is estabished between the space within the casing and the outer space surrounding the casing, the pressure-sensitive bellows 5 is adapted to operate the lever 10 and cause a contact 23, secured thereto, touch a stationary contact 24 mounted on a member 25 extending from the arm 11. When the contacts 23 and 24 are in engagement, a circuit is established from the battery 16, through conductor 17, contacts 23 and 24, conductor 26, electromagnet 27, to battery 16. Current from the battery 16 flows through this circuit and causes the electromagnet 27 to be energized to operate a circuit breaker or to ring a bell, or to open valves to relieve the excessive pressure within the tank.

The collapsible chamber 5 communicates with the outer air surrounding the tank 7 and, therefore, is relatively sensitive to changes in pressure, as compared with a partially evacuated aneroid bellows, shown in Fig. 3.

When a gas, such as hydrogen, methane or other gas less dense than that normally present appears in the space occupied by the diffusion chamber 2, atmolysis occurs, and the flexible member 3 is moved outwardly under the influence of the increased pressure within the chamber 2 to cause the member 14 to touch the contactor 12.

An indicating device, such as a bell 15, is connected in electrical-circuit relation with the contactors 12 and 14 and a source of energy, such as a battery 16, by electrical conductors 17 and 18. When the member 14 touches the contactor 12, the battery 16 rings the bell 15.

If, however, instead of the presence of a gas, as aforesaid, a fall in pressure occurs in the space surrounding the chamber 2, the bell would be rung, were it not for the action of the bellows 5 which, in expanding in response to the reduced pressure, operates to keep the contact terminals 12 and 14 spaced at a suitable distance apart, ready to respond to the action of atmolysis alone. Should a rise in pressure occur, resulting in a movement of the flexible member 3 inwardly, the concurrent compression of the bellows 6 causes contact 12 to follow contact 14 in such manner as to maintain normal spacing.

The device may be adapted to detect gases more dense than the normally surrounding medium by simply maintaining the contacts 12 and 14 normally in engagement and by causing a break between them to initiate an alarm.

Fig. 2 shows our device disposed in the gas-cushion space 19 above the oil 20 in a transformer 21. Any foreign gases which may be present in the space 19, as, for example, those arising from the thermal decomposition of liquid or solid insulation, diffuse into the porous walls of cell 2. The resulting increase or decrease of pressure causes engagement of the contacts to operate the alarm. The pressure bellows 5 compensates the device 1 for errors incident to the changes in pressure of the gas in the space 19, such as may be caused by the heating and cooling of the apparatus 22, as outlined above.

While we have shown the pressure-sensitive bellows 5 as communicating with the outer air by an opening 6 through the casing 7, it will be apparent to those skilled in the art that the chamber 5 may be sealed and partially evacuated to act as an aneroid barometer. The former device is desirable, however, because it is more sensitive to pressure changes than an aneroid chamber disposed within the tank.

Referring particularly to Fig. 3, the gas detector 1 is compensated for pressure changes not due to atmolysis by an aneroid bellows 28. The latter comprises a partially evacuated chamber 29, the walls of which are held from collapse, due to pressure, by a spring 30. The lever 10, in the modification shown in Fig. 3, is extended to provide a support for contactor 24 which latter cooperates with contactor 25 that here is mounted on a member 31 extending from the tank 7.

The aneroid bellows 28 compensates the gas detector 1 for errors incident to changes in pressure by moving the contactor 12 away from, or toward, the contactor 14, with decrease or increase, respectively, of the pressure of the medium surrounding the detector 1, in a manner similar to that indicated above in connection with the drum 5.

It will be appreciated that our invention may be variously modified without departing from the spirit and scope thereof, as set forth in the appended claims.

We claim as our invention:

1. In an inclosed vessel, the combination with a gas detector, of means including a device responsive to pressure changes within the vessel for compensating said detector for errors incident to changes in pressure within the vessel.

2. The combination with an atmolytic gas detector comprising a chamber formed with a porous wall and a flexible member covering an opening therein, of means including a pressure-responsive member for compensating said detector for errors incident to changes in pressure external to said chamber.

3. In combination, an atmolytic gas detector, means associated therewith for performing an indicating operation, and means including a pressure-responsive chamber for compensating said gas detector for changes in the pressure of the surrounding medium.

4. In combination, a substantially gas-tight tank, electrical apparatus disposed within said tank, an insulating liquid partially filling said tank, a gas filling the space above said fluid, means for indicating when said gas is adulterated to a predetermined degree by another gas of a different diffusibility, and means for compensating said indicating means for errors incident to changes in the gas pressure within said space.

5. In combination, means for separating mingled gases of unequal diffusibility by transmission through a porous substance, means for moving a member in accordance with said separation, means for causing said member to initiate an indicating operation, and means for compensating said member for changes in the pressure of the fluid surrounding said member.

6. In combination with a gas detector and a pressure-compensating device therefor, of means for initiating a control when the pressure affecting said compensating device reaches a predetermined value.

7. In combination, a fluid-containing tank subject to changes in pressure, a pressure-responsive chamber in said tank having a free communication with the space outside of the tank, and means, including said chamber, for initiating a control indicative of a predetermined pressure in said tank.

8. In combination, a substantially sealed tank, a fluid within said tank subject to changes in pressure, and a pressure-responsive device comprising a resiliently collapsible chamber communicating with the atmosphere surrounding said tank, for initiating a control.

9. The combination with a gas detector subject to errors incident to changes in pressure of the surrounding medium, of means, including a resiliently collapsible chamber disposed in said medium, for compensating said detector for said error.

In testimony whereof, we have hereunto subscribed our names.

CHARLES A. STYER.
WALTER M. DANN.